United States Patent [19]

Berry et al.

[11] 3,852,945
[45] Dec. 10, 1974

[54] MOWER ATTACHMENT FOR GRADER BLADE

[76] Inventors: Ray J. Berry, 524 No. 33rd; Lonzo L. Simons, 2820 Morrow St., both of Waco, Tex. 76707

[22] Filed: July 9, 1973

[21] Appl. No.: 377,233

[52] U.S. Cl. .................... 56/12.7, 56/16.7, 56/503
[51] Int. Cl. .............................................. A01d 55/22
[58] Field of Search .......... 56/500, 503, 12.7, 15.2, 56/17.1, 17.2, 17.5, 320.2, 229, 295

[56] References Cited
UNITED STATES PATENTS

| | | | |
|---|---|---|---|
| 2,634,571 | 4/1953 | Lawrence et al. | 56/12.7 |
| 2,751,737 | 6/1956 | Herod | 56/12.7 |
| 2,872,770 | 2/1959 | Murphy et al. | 56/16.7 |
| 2,949,004 | 8/1960 | Jones | 56/15.2 |
| 2,998,689 | 9/1961 | Boesch, Jr. | 56/12.7 |
| 3,005,302 | 10/1961 | Lucia et al. | 56/320.1 |
| 3,043,082 | 7/1962 | Northcote et al. | 56/503 |
| 3,059,398 | 10/1962 | Bottenberg | 56/320.2 |
| 3,063,226 | 11/1962 | Pfauser | 56/15.3 |
| 3,340,681 | 9/1967 | Strawbridge | 56/229 |
| 3,462,925 | 8/1969 | Lanier | 56/10.9 |

Primary Examiner—Russell R. Kinsey
Attorney, Agent, or Firm—Clarence A. O'Brien; Harvey B. Jacobson

[57] ABSTRACT

A heavy duty rotary mower structure including a downwardly opening shroud within which a horizontal motor driven rotary blade member is journaled is provided and supported from one end portion of the transverse blade member of a road grader of the type wherein the blade member is supported from the grader for vertical adjustment relative thereto, adjustable angular displacement about an upstanding axis and adjustable angular displacement about a horizontal axis extending longitudinally of the grader. The heavy duty rotary mower includes depending opposite side skids and projects at least slightly outwardly of the end portion of the grader blade upon which it is mounted, whereby the grader may be driven along the shoulder of a road and the blade of the grader may be adjustably inclined so as to properly position the heavy duty rotary mower to cut vegetation along the shoulder of the road.

10 Claims, 7 Drawing Figures

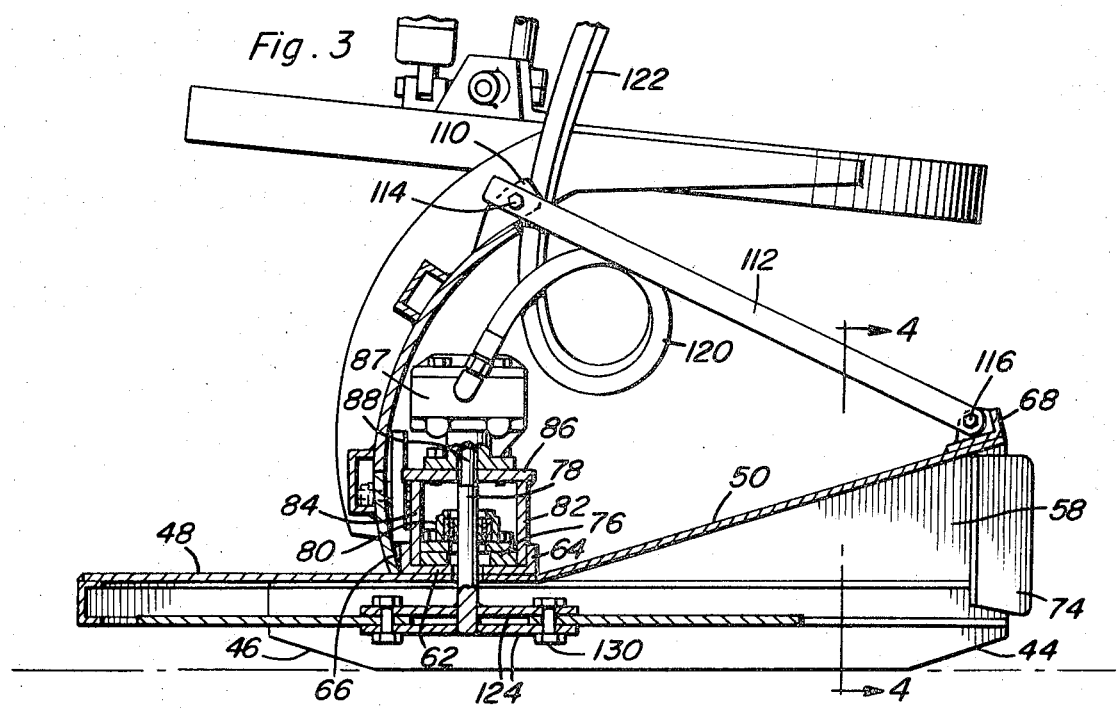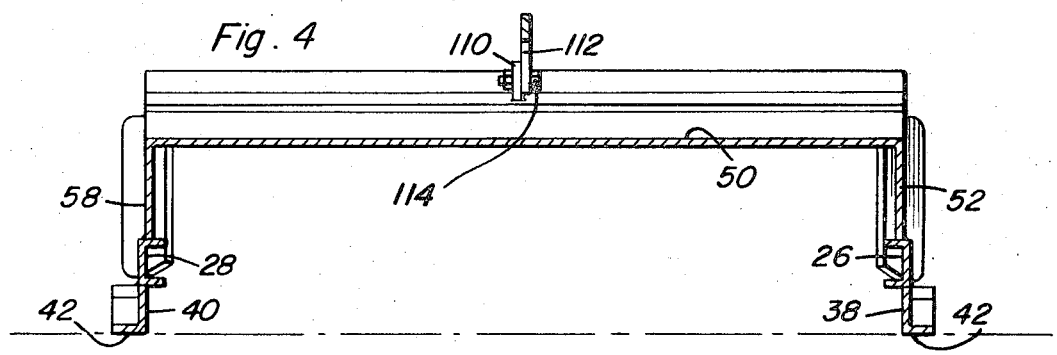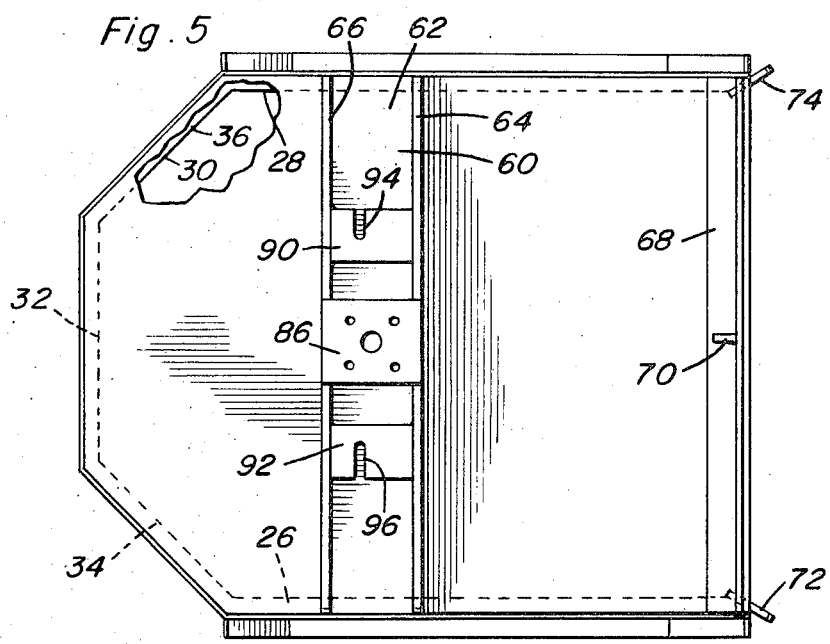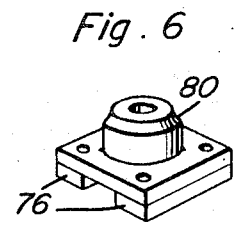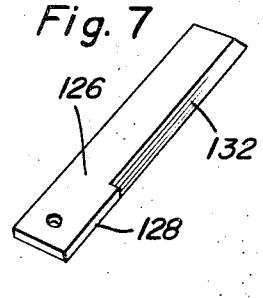

MOWER ATTACHMENT FOR GRADER BLADE

The rotary mower of the instant invention has been designed specifically for use on a road grader of the type including a central transverse grading blade supported from the mower for vertical shifting, angular displacement about an upstanding axis and angular displacement about an axis extending longitudinally of the grader. The mower, by being supported from one end of the blade may be utilized to cut vegetation disposed between a road and a ditch extending along the road.

The rotary mower is readily releasably supported from the grader blade and is equipped with a hydraulic motor for driving the rotary blade thereof, the rotary motor being hydraulically actuated and readily drivable from any suitable source of hydraulic fluid under pressure provided on the grader.

The rotary mower includes a downwardly opening shroud within which the rotary blade is journaled and the forward portion of the top wall of the shroud is forwardly and upwardly inclined whereby heavy vegetation will not be bent over close to the ground before being acted upon by the rotary blade of the mower.

The main object of this invention is to provide a rotary mower which may be readily removably supported from one end portion of the transverse blade of a road grader and including a rotary blade assembly which may be driven by a hydraulic motor deriving its source of hydraulic fluid under pressure from the aforementioned source of fluid under pressure.

Another object of this invention, in accordance with the immediately preceding object, is to provide a rotary mower and mounting therefor whereby the mower may be readily mounted on the blade of a road grader in a manner such that modifications of the grader blade are maintained at a minimum.

A still further object of this invention is to provide a rotary mower for the blade of a road grader and constructed in a manner whereby heavy vegetation may be readily cut by the rotary mower without the heavy vegetation being bent down close to the ground before being acted upon by the rotary blade portion of the mower.

A final object of this invention to be specifically enumerated herein is to provide a rotary mower attachment for a grader blade in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is a fragmentary longitudinal vertical sectional view taken substantially upon the plane indicated by the section line 3—3 of FIG. 2;

FIG. 4 is a transverse vertical sectional view taken substantially upon the plane indicated by the section line 4—4 of FIG. 3;

FIG. 5 is a top plan view of the rotary mower with the hydraulic driving motor thereof removed and a portion of the top wall of the mower broken away to more clearly illustrate the otherwise hidden structural features thereof;

FIG. 6 is a perspective view of the bearing assembly by which the vertical shaft of the rotary mower is journaled from the frame of the mower; and FIG. 7 is a perspective view of one of the cutting tips of the blade assembly of the rotary mower.

Figure 1:
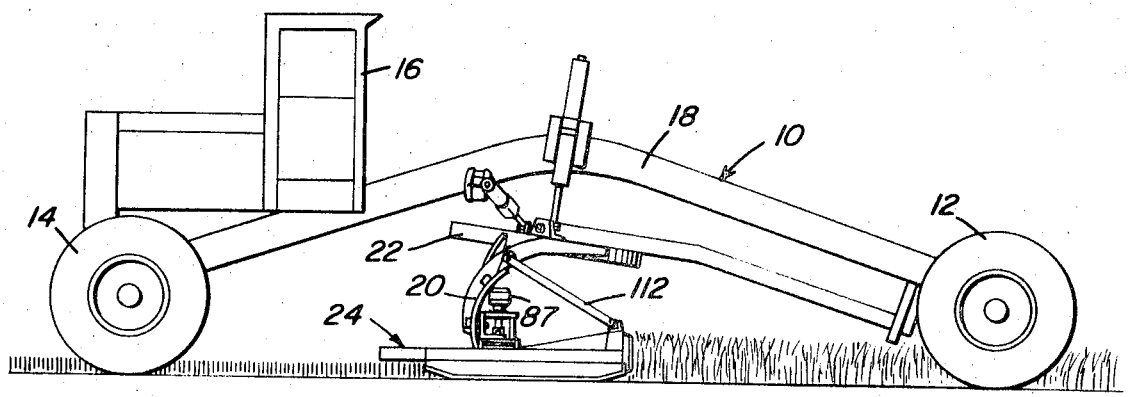
FIG. 1 is a side elevational view of a conventional form of road grader with the mower of the instant invention operatively associated with the grader blade of the road grader.

Referring now more specifically to the drawings, the numeral 10 generally designates a conventional form of road grader including front and rear wheels 12 and 14 and an operator's cab 16. An arched connecting beam 18 extends between the front and rear wheels 12 and 14 and a grader blade 20 is supported from a transversely tiltable and vertically adjustable turntable 22 whereby the blade 20 may be adjusted in elevation and may be angularly adjusted about an upstanding axis as well as a horizontal axis extending longitudinally of the grader 10. It is to be appreciated that the mounting of the blade 20 in this manner is conventional and that the various adjustments of the blade is carried out by fluid motors which derive their power from a source (not shown) of hydraulic fluid under pressure comprising a conventional portion of the grader 10.

A rotary mower referred to in general by the reference numeral 24 is provided and includes inwardly opening generally horizontal opposite side C-shaped frames or channel members 26 and 28 interconnected at their rear ends by means of a transverse inwardly opening similar channel member 30 extending between the channel members 26 and 28. The channel member 30 includes a generally transverse center section 32 and a pair of forwardly divergent opposite end sections 34 and 36 whose forward ends are secured to the rear ends of the channel members 26 and 28, respectively.

The channel members 26, 28 and the sections 32, 34 and 36 of the channel member 30 are disposed in the same horizontal plane and the longitudinal channel members 26 and 28 include dependingly supported longitudinally extending horizontal angle members 38 and 40 defining runners. The lower horizontal flange 42 of each angle member 38 and 40 is inclined upwardly at its forward end as at 44 and also inclined upwardly at its rear end as at 46.

A heavy gauge top wall 48 is secured over the rear end portions of the channel members 26 and 28 and the upper marginal portions of the center and end sections 32, 34 and 36 of the channel member 30. The forward portion of the top wall 48 is forwardly and upwardly inclined as at 50 and the forward portion 50 of the top wall 48 includes opposite side depending side portions 52 and 58 which extend downwardly to the forward end portions of the channel members 26 and 38.

A horizontal transverse and upwardly opening channel member 60 is provided and overlies the top wall 48. The opposite ends of the channel member 60 and the underlying portions of the top wall 48 are secured, in any convenient manner such as by welding, to the channel members 26 and 28 spaced forward of the rear ends thereof and the channel member 60 may be seen to include a wide web portion 62 and opposite side longitudinally extending upwardly projecting side flanges 64 and 66.

Figure 2:
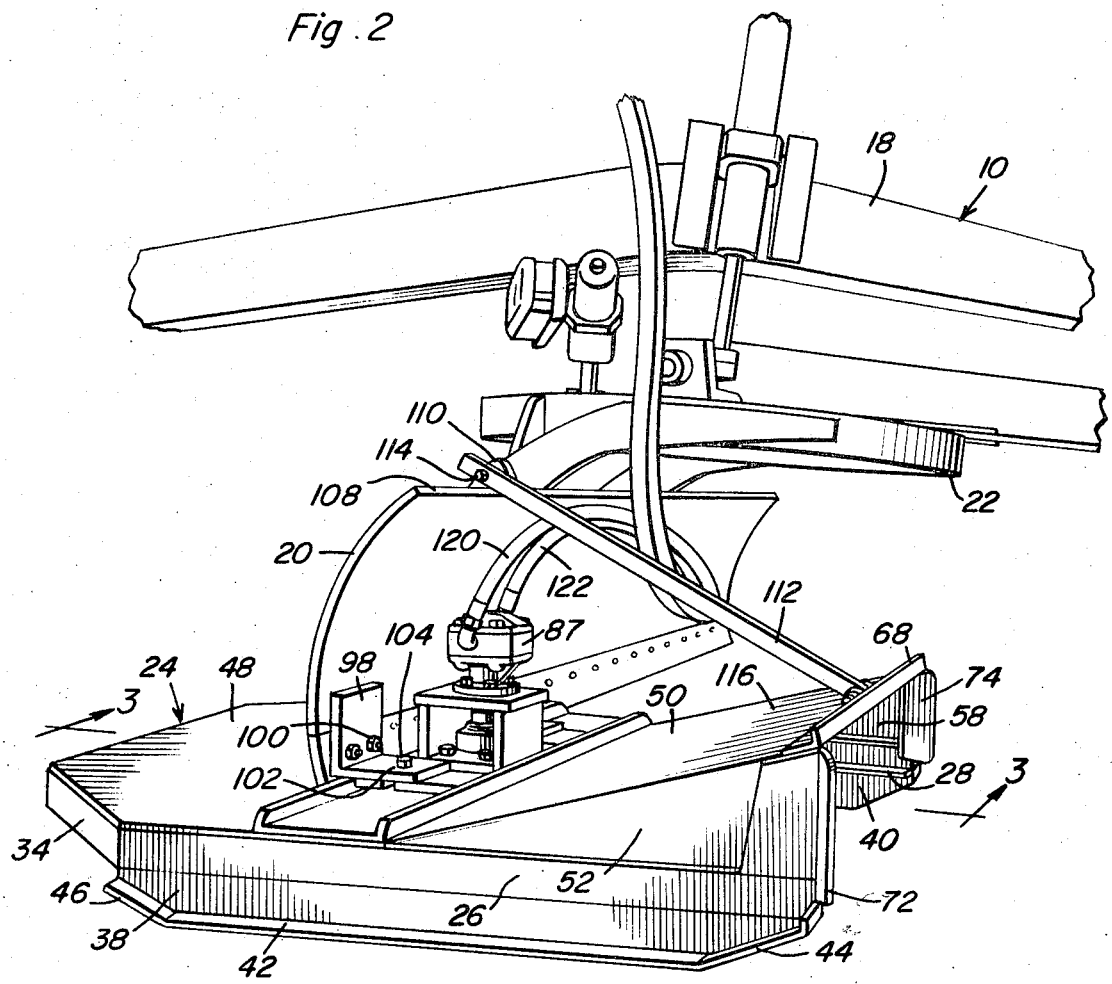
FIG. 2 is a fragmentary enlarged perspective view of the rotary mower and the adjacent portions of the road grader.

The forward marginal edge portion of the forwardly and upwardly inclined forward portion 50 of the top wall 48 is provided with a reinforcing angle member 68 extending therealong and secured to the upper surface of the forward marginal edge portion and the central portion of the reinforcing angle member 68 includes an apertured anchor ear 70. Also, from FIGS. 2, 3 and 5 of the drawings it may be seen that the upstanding forward marginal edge portions of the side portions 52 and 58 include upstanding forwardly divergent guide plates 72 and 74 defining an entrance throat therebetween.

A centrally apertured reinforcing plate 76 is secured over the central portion of the web portion 62 and the web portion 62 and top wall 48 are each apertured accordingly for receiving an upstanding mower shaft 78 therethrough. The shaft 78 is journaled from the plate 76 by means of a combined journal and thrust bearing assembly 80 removably secured to the plate 76 and the upper end of the shaft 78 projects above the bearing assemby 80 and is provided with a non-circular upwardly opening bore.

A pair of front and rear upstanding transverse support plates 82 and 84 are secured to the inner surfaces of the central portions of the flanges 64 and 66 and a mounting plate 86 is secured over the upper marginal portions of the plates 82 and 84 and has a hydraulic motor 87 removably supported therefrom including a depending rotary output shaft 88 whose lower end is telescopingly coupled to the upper end of the shaft 78.

The channel member 60 has a pair of horizontal mounting plates 90 and 92 secured between the flanges 64 and 66 thereof spaced above the web portions 62 and on opposite sides of the plates 82, 84 and 86. The mounting plates 90 and 92 have oppositely transversely opening slots 94 and 96 formed therein and the grader blade 20 has a pair of right angled mounting brackets 98 removably secured thereto as at 100 and each mounting bracket 98 includes a horizontally forwardly projecting flange 102 having an upstanding fastener 104 secured therethrough. The mounting brackets 98 are positionable over the mounting plates 90 and 92 with the fasteners 104 seated in the slots 94 and 96. Of course, the fasteners 104 are of the threaded shank type fasteners and may be tightened to thereby rigidly support the rotary mower 24 from the right hand end of the grader blade 20. Further, it will also be noted that the mounting brackets 98 could also be supported from the left hand end portion of the grader blade 20. In any event, the rotary mower 24 is readily removably secured to the grader blade.

The right hand end portion of the upper marginal edge 108 of the grader blade 20 includes a rearwardly and upwardly projecting apertured anchor 110 to which the rear end of a forwardly and downwardly inclined brace arm 112 is attached by means of a fastener 114. Also, the forward lower end of the brace arm 112 is attached by means of a fastener 116 to the anchor 70 carried by the reinforcing angle member 68 extending along the forward marginal edge portion of the top wall 48. In this manner, the rotary mower 24 is sufficiently braced against angular displacement about a horizontal axis extending longitudinally of the grader blade.

The motor 87 is supplied hydraulic fluid under pressure through a hydraulic line 120 from a source (not shown) on the grader 10 and hydraulic fluid is returned to the source through a hydraulic line 122. The source of hydraulic fluid under pressure is conventionally supplied on the grader 10 in order to provide a means for powering the various hydraulic motors which tilt the turntable 22 about a horizontal longitudinal axis, raise and lower the turntable and also rotate the turntable about an upstanding axis.

The lower end of the shaft 78 passes through and is welded to the midportions of a pair of vertically spaced horizontal plates 124 and a pair of elongated cutting blades 126 have their inner end portions 128 pivotally supported between corresponding ends of the plates 124 by means of threaded shank-type fasteners. The thickness of the blades 126 is slightly less than the spacing between the plates 124 and the outer end portions of the longitudinal edges of each blade member 126 are beveled and sharpened as at 132.

In operation, the grader 10 may be readily maneuvered so as to place the mounting brackets 98 in approximate position for securement to the plates 90 and 92. After the mounting brackets 98 have been secured to the mounting plates 90 and 92 and the bracing arm 112 has been secured in position, the hydraulic lines 120 and 122 may be connected to the motor 86. Thereafter, the grader 10 may be utilized as a self-powered rotary mower and it will be appreciated that the right hand end of the grader blade 20 may readily be adjusted in position so as to enable the rotary mower 24 to cut heavy foliage extending along the roadway upon which the grader 10 is being moved.

The forwardly and upwardly inclined forward portion 50 of the top wall 48 enables heavy vegetation to be received within the forward portion of the downwardly opening shroud portion of the rotary mower 24 without the heavy vegetation being bent over close to the ground in a manner which may prevent a majority of that heavy vegetation from being acted upon by the cutter blades 126. To the contrary, the higher elevation of the forward portion 50 of the top wall 48 ensures that the heavy vegetation will at least be initially cut by the mower and thereafter cut up into finer pieces as the rotary mower 24 is advanced forwardly.

Inasmuch as the opposite side portions of the frame of the rotary mower as represented by the opposite end portions of the channel member 60 are rigidly supported from the grader blade 20 and the inclined brace 112 is provided for use in the manner above described and illustrated in the drawings, the mower 24 may be seen to be adequately supported from the grader blade 20 against angular displacement relative thereto. Further, the rotary mower may be readily disengaged from the grader blade 20 with a minimum effort thereby enabling the grader 10 to be quickly changed back into condition for use in grading operations.

The foregoing is considered as illustrative only of the principles the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A heavy duty rotary mower for support from a mobile vehicle, said mower having an elongated frame defining opposite sides and front and rear ends and including longitudinal opposite side members and transverse members extending between said opposite side members and rigidly connecting the latter at points spaced therealong, vertical shaft means journaled from said frame intermediate its opposite sides and front and rear ends, horizontal rotary blade means mounted on said shaft means between said side members, and motor means carried by said frame drivingly connected to said shaft, a road grader of the type having a central transverse grader blade supported therefrom for angular displacement about an upstanding axis and adjustable tilting about an axis extending longitudinally of said grader as well as vertical adjustment relative to the latter, said rotary mower being mounted on one end of said blade and projecting at least slightly outwardly of said one end of said blade, said transverse members including a central transverse member connected to and extending between said side members and from which said means is journaled, said central transverse member comprising an upwardly opening channel member including a lower web portion and opposite side upstanding flanges, said motor means being carried by said channel member centrally intermediate its opposite ends, and mounting brackets carried by said channel member on opposite sides of said motor, said one end of said grader blade including mounting brackets carried by and spaced along the lower marginal portion of said one end of said grader blade from which the first mentioned mounting brackets are releasably supported.

2. The combination of claim 1 wherein the upper marginal edge portion of said grader blade includes an anchor member intermediate vertical planes normal to said blade passing through the second mentioned mounting brackets, and an inclined brace member secured to and extending between said anchor member and one end of said mower.

3. The combination of claim 2 wherein said frame includes a top wall secured over said opposite side members, a forward portion of said top wall disposed forward of said shaft being forwardly and upwardly inclined, the end of said brace member remote from said anchor member being attached to the central forward marginal portion of said top wall.

4. The combination of claim 3 wherein the inclination of said forward portion of said top wall is at least 10 degrees relative to the horizontal when said blade means is horizontally disposed.

5. The combination of claim 4 wherein said opposite side members include dependingly supported horizontal longitudinal runner means.

6. The combination of claim 1 wherein said frame includes a top wall secured over said opposite side members, a forward portion of said top wall disposed forward of said shaft means being forwardly and upwardly inclined.

7. The combination of claim 6 wherein the inclination of said forward portion of said top wall is at least 10° 10 degrees relative to the horizontal when said blade means is horizontally disposed.

8. The combination of claim 6 wherein the forward portion of said top wall includes depending side portions joined to the forward portions of said side members closing the sides of said frame above said blade means.

9. The combination of claim 1 wherein said opposite side members include dependingly supported horizontal longitudinal runner means.

10. In combination with a road grader of the type including a central transverse grader blade having opposite end portions and a lower marginal portion and supported from said road grader for angular displacement about an upstanding axis and adjustable tilting about an axis extending longitudinally of the grader as well as vertical adjustment relative to the latter, a rotary mower assembly including a frame having opposite sides and front and rear ends, means releasably supporting said frame from one end portion of said lower marginal portion with the latter extending transversely of said frame generally centrally intermediate the front and rear ends thereof and with said frame underlying said grader blade, elongated brace means extending and releasably connected between one end portion of said frame and an upper portion of said one end portion of said grader blade, said rotary mower assembly further including an upstanding driven shaft journaled from a central portion of said frame, and a horizontal rotary blade structure mounted on a lower portion of said shaft.

* * * * *